(12) United States Patent
Weckbecker et al.

(10) Patent No.: US 10,144,461 B2
(45) Date of Patent: Dec. 4, 2018

(54) SPROCKET FOR A CRAWLER UNDERCARRIAGE, CRAWLER UNDERCARRIAGE HAVING SUCH A SPROCKET, AND CRANE HAVING SUCH A CRAWLER UNDERCARRIAGE

(71) Applicant: Terex Global GmbH, Schaffhausen (CH)

(72) Inventors: Alfons Weckbecker, Zweibrücken (DE); Werner Rutz, Queidersbach (DE)

(73) Assignee: TEREX GLOBAL GMBH, Schaffhausen (CH)

( * ) Notice: Subject to any disclaimer, the term of this patent is extended or adjusted under 35 U.S.C. 154(b) by 26 days.

(21) Appl. No.: 15/402,488

(22) Filed: Jan. 10, 2017

(65) Prior Publication Data

US 2017/0197676 A1    Jul. 13, 2017

(30) Foreign Application Priority Data

Jan. 12, 2016  (DE) .................. 10 2016 200 224

(51) Int. Cl.
| | |
|---|---|
| *B62D 55/125* | (2006.01) |
| *B66C 9/10* | (2006.01) |
| *B62D 55/12* | (2006.01) |
| *B62D 55/06* | (2006.01) |
| *F16H 55/30* | (2006.01) |

(52) U.S. Cl.
CPC .......... *B62D 55/125* (2013.01); *B62D 55/12* (2013.01); *B66C 9/10* (2013.01); *B62D 55/06* (2013.01); *F16H 55/30* (2013.01)

(58) Field of Classification Search
CPC ...... B62D 55/12; B62D 55/125; B62D 55/13; B62D 55/135
See application file for complete search history.

(56) References Cited

U.S. PATENT DOCUMENTS

| | | | | |
|---|---|---|---|---|
| 1,986,270 A | * | 1/1935 | Adolphe | B62D 55/12 474/162 |
| 2,302,658 A | * | 11/1942 | Artz | B62D 55/12 305/100 |
| 2,426,032 A | * | 8/1947 | Law | B62D 55/22 305/48 |
| 3,880,478 A | * | 4/1975 | Baylor | B62D 55/0885 305/115 |
| 4,111,064 A | * | 9/1978 | Purcell | F16H 55/12 474/162 |
| 4,253,344 A | * | 3/1981 | Kerklies | B65G 23/06 474/96 |
| 4,487,088 A | | 12/1984 | Olson | |
| 5,026,329 A | * | 6/1991 | Diekevers | B62D 55/0963 474/162 |

(Continued)

FOREIGN PATENT DOCUMENTS

| | | |
|---|---|---|
| DE | 10022080 C2 | 7/2002 |
| EP | 1033509 A2 | 9/2000 |

*Primary Examiner* — Kip T Kotter
(74) *Attorney, Agent, or Firm* — Browdy and Neimark, PLLC

(57) ABSTRACT

A sprocket for a crawler undercarriage comprises a plurality of sprocket teeth for engagement with a crawler track, wherein the sprocket teeth are arranged in a plurality of similar circumferential segments along the sprocket, and wherein an odd number of circumferential segments is provided.

7 Claims, 2 Drawing Sheets

(56) References Cited

U.S. PATENT DOCUMENTS

| | | | | |
|---|---|---|---|---|
| 5,456,527 | A | * 10/1995 | Hilgers | B62D 55/135 |
| | | | | 305/198 |
| 6,007,166 | A | * 12/1999 | Tucker | B62D 55/125 |
| | | | | 305/108 |
| 2001/0045773 | A1 | 11/2001 | Rutz et al. | |
| 2004/0149063 | A1* | 8/2004 | Kanzler | B62D 55/0963 |
| | | | | 74/460 |
| 2008/0161144 | A1* | 7/2008 | Hirai | F16H 55/08 |
| | | | | 474/141 |
| 2009/0209380 | A1 | 8/2009 | Hirai et al. | |
| 2009/0286639 | A1* | 11/2009 | Sakura | F16H 55/08 |
| | | | | 474/152 |
| 2010/0133020 | A1* | 6/2010 | Matsui | B62D 55/00 |
| | | | | 180/9.64 |

* cited by examiner

SPROCKET FOR A CRAWLER UNDERCARRIAGE, CRAWLER UNDERCARRIAGE HAVING SUCH A SPROCKET, AND CRANE HAVING SUCH A CRAWLER UNDERCARRIAGE

CROSS-REFERENCES TO RELATED APPLICATIONS

This application claims the priority of German Patent Application, Serial No. 10 2016 200 224.4, filed Jan. 12, 2016, pursuant to 35 U.S.C. 119(a)-(d), the content of which is incorporated herein by reference in its entirety as if fully set forth herein.

FIELD OF THE INVENTION

The invention concerns a sprocket for a crawler undercarriage, a crawler undercarriage having such a sprocket, and a crane having such a crawler undercarriage.

BACKGROUND OF THE INVENTION

A sprocket for a crawler undercarriage is known from DE 100 22 080 C2.

A sprocket for a crawler undercarriage is called a tumbler.

SUMMARY OF THE INVENTION

It is an object of the present invention to improve a crawler undercarriage.

The object is solved in accordance with the invention by a sprocket for a crawler undercarriage having a plurality of sprocket teeth for engagement with a crawler track,
wherein the sprocket teeth are arranged in a plurality of similar circumferential segments along the sprocket,
wherein an odd number of circumferential segments is provided, by a crawler undercarriage with a sprocket according to the invention, and by a crane with a crawler undercarriage according to the invention.

In accordance with the invention, it has been discovered that an odd number of circumferential segments on a sprocket enables the diameter of a sprocket to be advantageously diminished. A diminished sprocket diameter results in increased propulsive force. In particular, as compared to the sprocket per DE 100 22 080 C2, which comprises two identical circumferential segments each having five teeth distributed over a circumferential angle of 180°, a reduction in the number of sprocket teeth is improved and, in particular, is possible in an uncomplicated manner. The sprocket teeth are distributed among the several similar, in particular identical, circumferential segments along the sprocket. The sprocket teeth serve to engage with the crawler track of the crawler undercarriage. In order to provide a correspondingly increased driving torque for the sprocket of the same size, a more powerful drive unit would be required. This would incur additional costs. The sprocket in accordance with the invention enables a cost reduction in terms of the travel drives, because the driving torque provided by a drive unit can be smaller in dimension, since in accordance with the invention the propulsion is increased. Through a reduction in sprocket size, the overall length of the crawler track for the crawler undercarriage can be optimized and thereby bring about a cost reduction. The sprocket in accordance with the invention causes less noise emission. The mechanical wear is reduced. When shifting from forward to rear drive, especially on a downhill stretch, a bottom plate is always held between a close gear pair and thereby prevents a run-out of a sprocket tooth against the crawler track, which may result in damage to and/or destruction of the crawler track. Such damage is substantially precluded with the sprocket in accordance with the invention. The sprocket in accordance with the invention enables a transmission to be engaged with reduced driving torque. In this way, the diameter of the sprocket in accordance with the invention can be reduced to provide a uniform propulsive force with the crawler undercarriage.

Three similar, in particular identical, circumferential segments ensure an advantageous distribution of the circumferential segments about the axis of rotation of the sprocket. Each circumferential segment extends by an angle of rotation of exactly 120° in relation to the central axis of rotation. Such an angle is especially advantageous as a wrap-around angle for the crawler track on the sprocket.

An odd number of sprocket teeth, in which each circumferential segment has an odd number of sprocket teeth, enables greater flexibility in the tooth pitch.

Precisely three sprocket teeth, in which each circumferential segment has precisely three sprocket teeth, enable an advantageous configuration of a sprocket having nine sprocket teeth. In particular, such a sprocket enables an advantageous reduction in the number of sprocket teeth of sprockets known from the prior art with ten teeth to a sprocket in accordance with the invention having nine teeth.

A sprocket, in which all sprocket teeth are substantially identical in configuration, in which all sprocket teeth are substantially identical in configuration, enables a uniform application of force from the sprocket to the crawler track. In particular, all sprocket teeth are exactly identical in configuration.

A sprocket having exactly nine sprocket teeth enables an advantageous force transmission from the track drive to the crawler track of the crawler undercarriage.

A sprocket having different tooth intervals between two neighbouring sprocket teeth enables an advantageous application of force from the sprocket to the crawler track. Surprisingly, it has been discovered that it is not even necessary for the tooth intervals within a circumferential segment to be arranged in a continuously increasing or continuously decreasing manner. In particular, it is conceivable that the tooth intervals in the circumferential direction within a circumferential segment initially increase and subsequently decrease again. This results in a fundamental difference vis-à-vis DE 100 22 080 C2.

A crawler undercarriage having a sprocket in accordance with the invention as well as a crane having such a crawler undercarriage essentially have the advantages of the sprocket, reference to which is hereby made.

Further advantageous embodiments, additional features and details of the invention will emerge from the following description of an exemplary embodiment with the aid of the drawing.

DESCRIPTION OF THE PREFERRED EMBODIMENT

Figure 1:
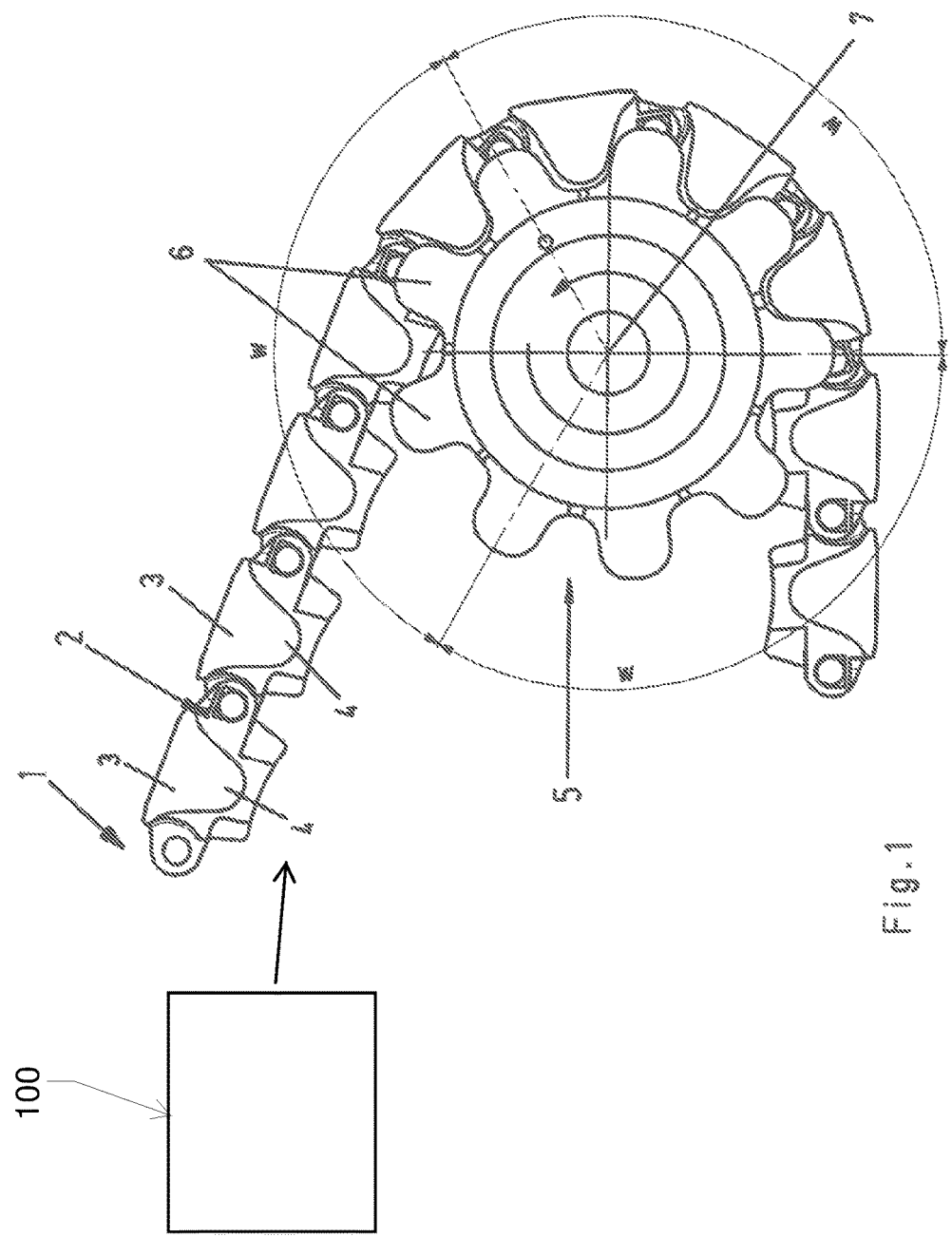
FIG. 1 shows a schematic partial side view of a crawler undercarriage having a sprocket and connected to a crane, in accordance with the invention.

A crawler undercarriage 1 can be used, for example, on a crane 100, especially on a caterpillar crane. The crawler undercarriage 1 can also serve for an excavator or other working apparatus.

The crawler undercarriage 1 is comprised of a revolving endless chain 2 having interconnected articulated chain links 3. Each chain link 3 has an engagement cam 4.

The crawler undercarriage 1, moreover, is comprised of a sprocket 5 having a total of 9 sprocket teeth 6. The sprocket 5 is able to be driven about an axis of rotation 7 by means of a drive unit (not shown) via a transmission (not shown) about the axis of rotation 7. In dependence upon the driving direction of turning about the axis of rotation 7, when the two crawler undercarriages 1 are running in the same direction travel forwards and backwards is possible, and a rotation of the crane is possible when the driving direction of the two crawler undercarriages 1 is different.

The sprocket 5 is comprised of a substantially cylindrical central disc 8. On the outer circumference of the central disc 8, the sprocket teeth 6 are formed with it as a single piece. The sprocket teeth 6 are arranged in three similar circumferential segments. This means that each time three sprocket teeth 6 are arranged in one circumferential segment.

Each circumferential segment extends across a circumferential angle of 120° in regard to the axis of rotation 7. It is clear that, with a different number n of the circumferential segments, the circumferential angle w about the axis of rotation 7 will change. In general: w=360°/n, where n is an odd number It is essential to provide an odd number of circumferential segments. In accordance with the exemplary embodiment shown, nine sprocket teeth 6 are provided, being distributed evenly among the three circumferential segments.

The design of the sprocket 5 shall be explained more closely below with the aid of FIG. 2. The sprocket teeth 6 are essentially identical in configuration. The sprocket teeth 6 are each designed as a cam. Two neighbouring sprocket teeth 6 are separated from each other by a tooth spacing 9. The tooth spacing 9 is designed substantially as a rounded groove. Two neighbouring sprocket teeth 6 have a tooth interval $z_1$, $z_2$ or $z_3$. The tooth interval $z_1$, $z_2$ or $z_3$ is defined as the angle interval of rotation about the axis of rotation 7 of the respective tooth centres of neighbouring sprocket teeth 6. Within a circumferential segment with the angle of turning w about the axis of rotation 7, the tooth intervals $z_1$, $z_2$ and $z_3$ add up to the circumferential angle w of the circumferential segment. We have: $w=z_1+z_2+z_3$.

Figure 2:
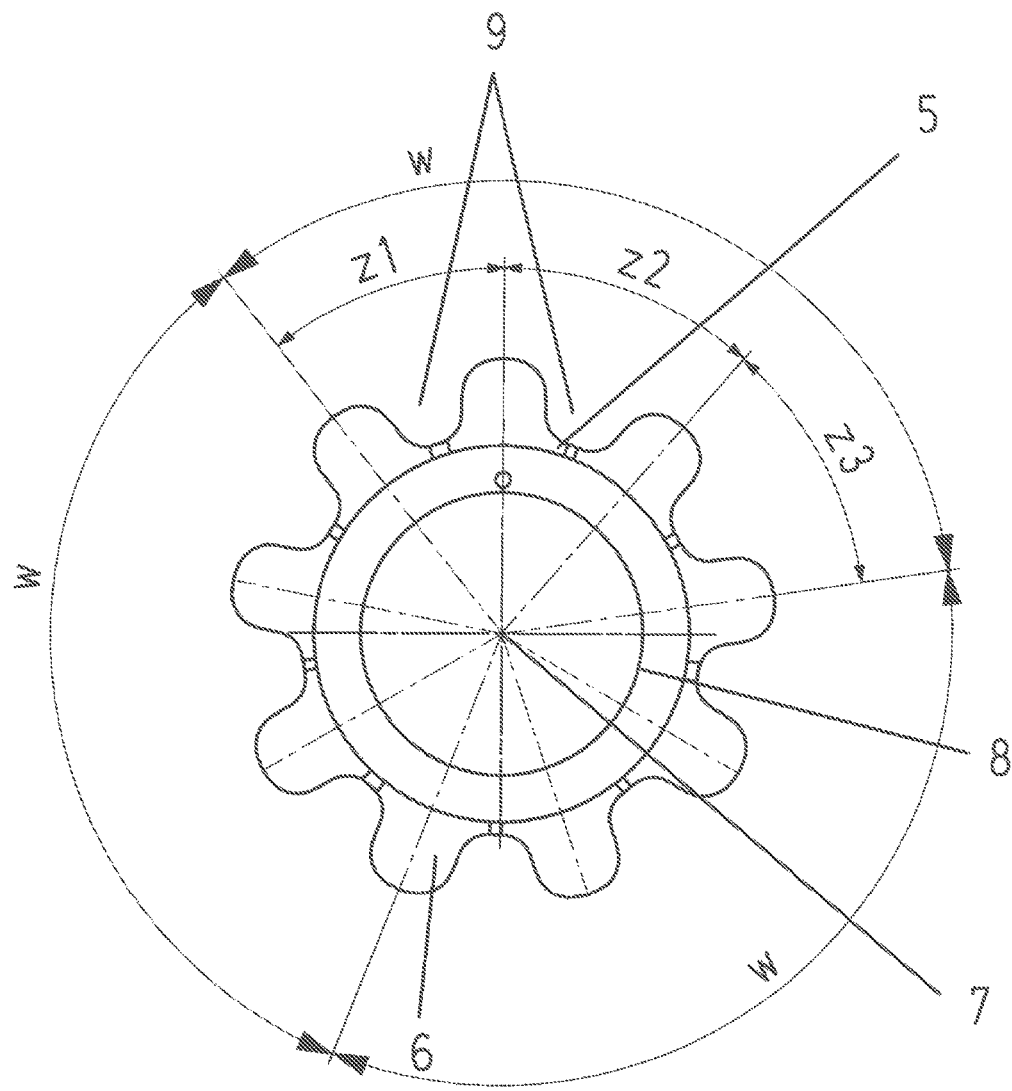
FIG. 2 shows an enlarged detail view of the sprocket per FIG. 1.

In accordance with the exemplary embodiment in FIG. 2, we have in regard to a direction of turning about the axis of rotation 7 in the clockwise sense: $z_1<z_2$, $z_2>z_3$. This means that, commencing with the first tooth interval of the circumferential segment in the direction of turning, i.e., in the clockwise sense, the first tooth interval $z_1$ increases to the second tooth interval $z_2$. From the second tooth interval $z_2$ this is reduced to the third tooth interval $z_3$. Conversely, this means that a maximum tooth interval is situated in a middle region of the circumferential segment. In particular, this means that even when the sprocket is turning in the opposite direction about the axis of rotation 7, i.e., in the anticlockwise sense in accordance with FIG. 2, at first a smaller tooth interval $z_3$ is followed by a larger tooth segment $z_2$, which is adjoined by another smaller tooth interval $z_1$.

The first tooth interval $z_1$ forms a minimal tooth interval. The two sprocket teeth 6 bounding the first tooth interval $z_1$ are designated as a close gear pair.

In a drive unit of the crawler undercarriage 1, the crawler track 2 is handed off from the sprocket tooth 6 situated at roughly 2 o'clock to the sprocket tooth 6 situated at roughly 6 o'clock.

What is claimed is:

1. A sprocket for a crawler undercarriage having a plurality of sprocket teeth for engagement with a crawler track,
   wherein the sprocket teeth are arranged in a plurality of similar circumferential segments along the sprocket,
   wherein an odd number of circumferential segments is provided,
   wherein each circumferential segment has an odd number of sprocket teeth,
   wherein different teeth intervals are provided between two neighbouring sprocket teeth, and
   wherein the tooth intervals in the circumferential direction within a circumferential segment initially increase and subsequently decrease again.

2. A sprocket according to claim 1, wherein precisely three similar circumferential segments are provided.

3. A sprocket according to claim 1, wherein each circumferential segment has precisely three sprocket teeth.

4. A sprocket according to claim 1, wherein all sprocket teeth are substantially identical in configuration.

5. A sprocket according to claim 1, wherein precisely nine sprocket teeth are provided.

6. A crawler undercarriage with a sprocket for the crawler undercarriage having a plurality of sprocket teeth for engagement with a crawler track,
   wherein the sprocket teeth are arranged in a plurality of similar circumferential segments along the sprocket,
   wherein an odd number of circumferential segments is provided,
   wherein each circumferential segment has an odd number of sprocket teeth,
   wherein different teeth intervals are provided between two neighbouring sprocket teeth, and
   wherein the tooth intervals in the circumferential direction within a circumferential segment initially increase and subsequently decrease again.

7. A crane with a crawler undercarriage with a sprocket for the crawler undercarriage having a plurality of sprocket teeth for engagement with a crawler track,
   wherein the sprocket teeth are arranged in a plurality of similar circumferential segments along the sprocket,
   wherein an odd number of circumferential segments is provided,
   wherein each circumferential segment has an odd number of sprocket teeth,
   wherein different teeth intervals are provided between two neighbouring sprocket teeth, and
   wherein the tooth intervals in the circumferential direction within a circumferential segment initially increase and subsequently decrease again.

* * * * *